(12) United States Patent
Li et al.

(10) Patent No.: US 7,835,149 B2
(45) Date of Patent: Nov. 16, 2010

(54) COMPUTER ENCLOSURE WITH AIRFLOW GUIDE

(75) Inventors: Yang Li, Shenzhen (CN); Yu-Hsu Lin, San Jose, CA (US); Jeng-Da Wu, Taipei Hsien (TW); Lei Guo, Shenzhen (CN); Liang-Liang Cao, Shenzhen (CN); Liang-Qing Shan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 92 days.

(21) Appl. No.: 12/341,395

(22) Filed: Dec. 22, 2008

(65) Prior Publication Data

US 2010/0097754 A1      Apr. 22, 2010

(30) Foreign Application Priority Data

Oct. 22, 2008    (CN) .................. 2008 2 0302523

(51) Int. Cl.
*H05K 7/20*    (2006.01)

(52) U.S. Cl. .................. 361/679.49; 361/691; 361/692; 361/694; 361/695; 454/184; 454/186

(58) Field of Classification Search ............ 361/691, 361/692, 694, 695, 679.49; 165/80.3, 80.4, 165/104.34; 454/184–186; 700/299, 300
See application file for complete search history.

(56) References Cited

U.S. PATENT DOCUMENTS

| | | | | |
|---|---|---|---|---|
| 3,443,588 A * | 5/1969 | Banko | .............. | 137/601.08 |
| 3,746,042 A * | 7/1973 | Finkel | .............. | 137/601.06 |
| 4,452,391 A * | 6/1984 | Chow | .............. | 236/49.3 |
| 4,541,326 A * | 9/1985 | Fukuda et al. | .............. | 454/258 |
| 5,020,423 A * | 6/1991 | Hill | .............. | 454/319 |
| 5,364,303 A * | 11/1994 | Terry | .............. | 454/155 |
| 5,443,420 A * | 8/1995 | Kim et al. | .............. | 454/256 |
| 5,630,469 A * | 5/1997 | Butterbaugh et al. | .......... | 165/80.3 |
| 5,769,709 A * | 6/1998 | Kim | .............. | 454/318 |
| 5,914,858 A * | 6/1999 | McKeen et al. | ............ | 361/695 |
| 6,031,719 A * | 2/2000 | Schmitt et al. | ............ | 361/695 |
| 6,484,521 B2 * | 11/2002 | Patel et al. | .............. | 62/171 |
| 6,736,196 B2 * | 5/2004 | Lai et al. | .............. | 165/122 |
| 6,817,196 B2 * | 11/2004 | Malone et al. | ............ | 62/171 |
| 6,826,048 B1 * | 11/2004 | Dean et al. | .............. | 361/695 |
| 7,236,361 B2 * | 6/2007 | Cote et al. | .............. | 361/695 |

(Continued)

FOREIGN PATENT DOCUMENTS

JP         57077847 A  *  5/1982

(Continued)

*Primary Examiner*—Anatoly Vortman
(74) *Attorney, Agent, or Firm*—Clifford O. Chi

(57) ABSTRACT

A computer enclosure includes a chassis with a plurality of heat generating components installed therein and an airflow guide structure. The airflow guide structure includes a fan and a duct attached to the fan. A pair of airflow outlets aligned with the fan is defined in the duct. The duct includes a plurality of pivot panels pivotally attached at airflow outlets. The pivot panels are configured to guide airflow from the fan to different positions of heat generating components in the chassis.

13 Claims, 3 Drawing Sheets

U.S. PATENT DOCUMENTS

| | | | |
|---|---|---|---|
| 7,399,222 B2 * | 7/2008 | Moon et al. | 454/277 |
| 7,492,590 B2 * | 2/2009 | Chen et al. | 361/695 |
| 7,656,664 B2 * | 2/2010 | Ye et al. | 361/695 |
| 2001/0014284 A1 * | 8/2001 | McCabe | 415/146 |
| 2004/0159713 A1 * | 8/2004 | Schmidt et al. | 236/49.3 |
| 2004/0194484 A1 * | 10/2004 | Zou et al. | 62/186 |
| 2005/0176364 A1 * | 8/2005 | Gehring et al. | 454/155 |
| 2006/0071087 A1 * | 4/2006 | Kates | 236/1 B |
| 2006/0071089 A1 * | 4/2006 | Kates | 236/94 |
| 2007/0095518 A1 * | 5/2007 | Kates | 165/208 |
| 2007/0137243 A1 * | 6/2007 | Lee et al. | 62/419 |
| 2007/0298706 A1 * | 12/2007 | Hudon et al. | 454/256 |
| 2008/0024979 A1 * | 1/2008 | Ye et al. | 361/691 |
| 2008/0310100 A1 * | 12/2008 | Sherrod et al. | 361/687 |
| 2009/0168330 A1 * | 7/2009 | Li et al. | 361/679.47 |

FOREIGN PATENT DOCUMENTS

| | | | | |
|---|---|---|---|---|
| JP | 62210290 A | * | 9/1987 | |
| JP | 01079533 A | * | 3/1989 | |
| JP | 06066445 A | * | 3/1994 | |

* cited by examiner

COMPUTER ENCLOSURE WITH AIRFLOW GUIDE

BACKGROUND

1. Technical Field

The present disclosure relates to computer enclosures and, more particularly, to a computer enclosure with an airflow guide structure.

2. Description of Related Art

A CPU and other electronic elements of a computer generate heat when the computer is operating. Typically, a CPU heat dissipating apparatus is mounted on the CPU to effectively dissipate the heat. A fan and an airflow guide duct may be installed in the computer to help dissipate the heat into the surroundings. However, the typical airflow guide duct provides only one airflow passage to dissipate heat and in only one direction.

Therefore, a computer enclosure with a airflow guide structure capable of dissipating heat from various directions is desired.

DETAILED DESCRIPTION OF THE EMBODIMENTS

Figure 1:
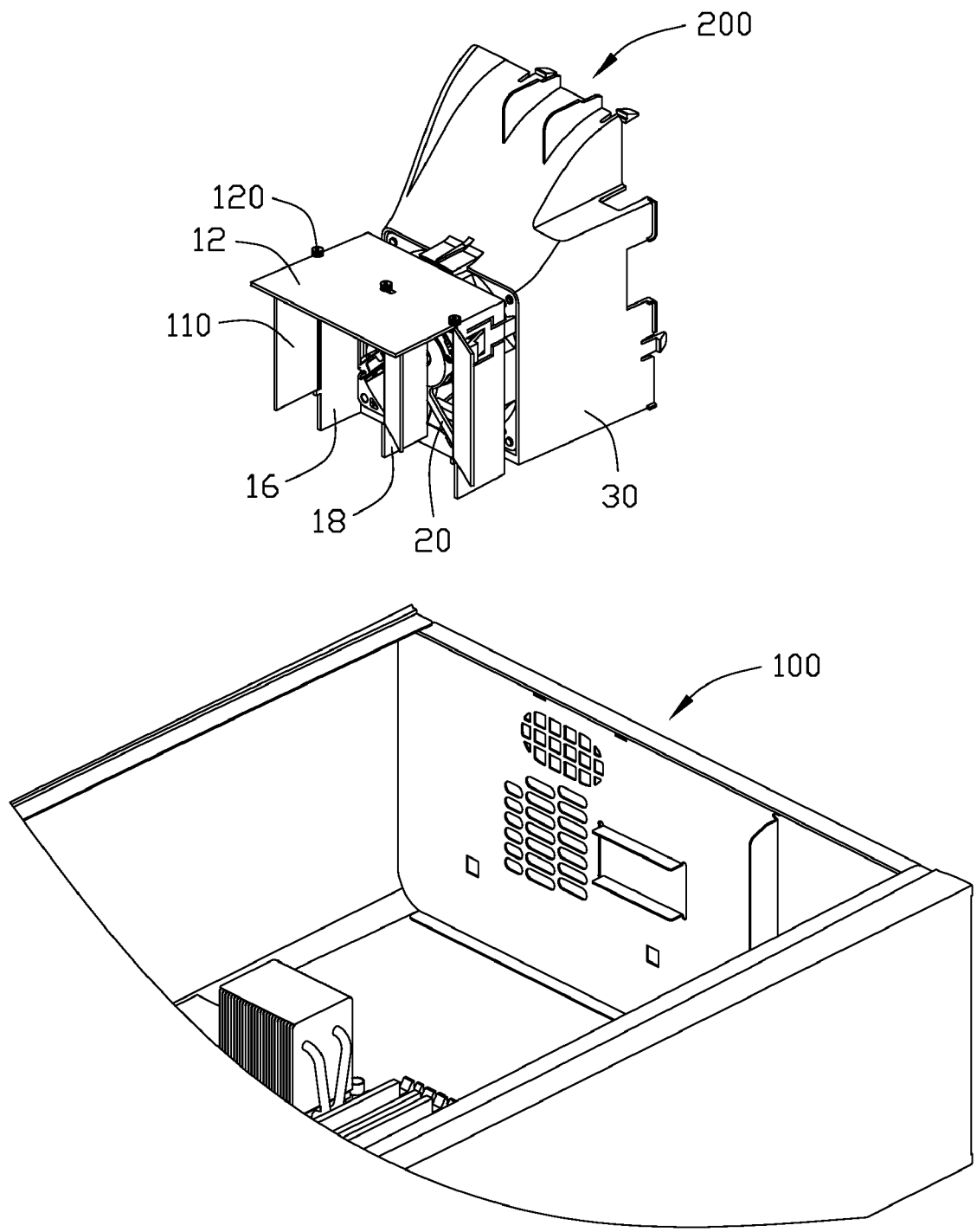
FIG. 1 is an exploded, isometric view of an embodiment of a computer enclosure, the computer enclosure including an airflow guide structure.

Referring to FIG. 1, an embodiment of a computer enclosure includes a chassis 100 and an airflow guide structure 200. A plurality of heat generating components (not labeled) such as a CPU and a memory are installed in the chassis 100. The airflow guide structure 200 is configured to cool the heat generating components to maintain a safe temperature in the chassis 100.

Figure 2:
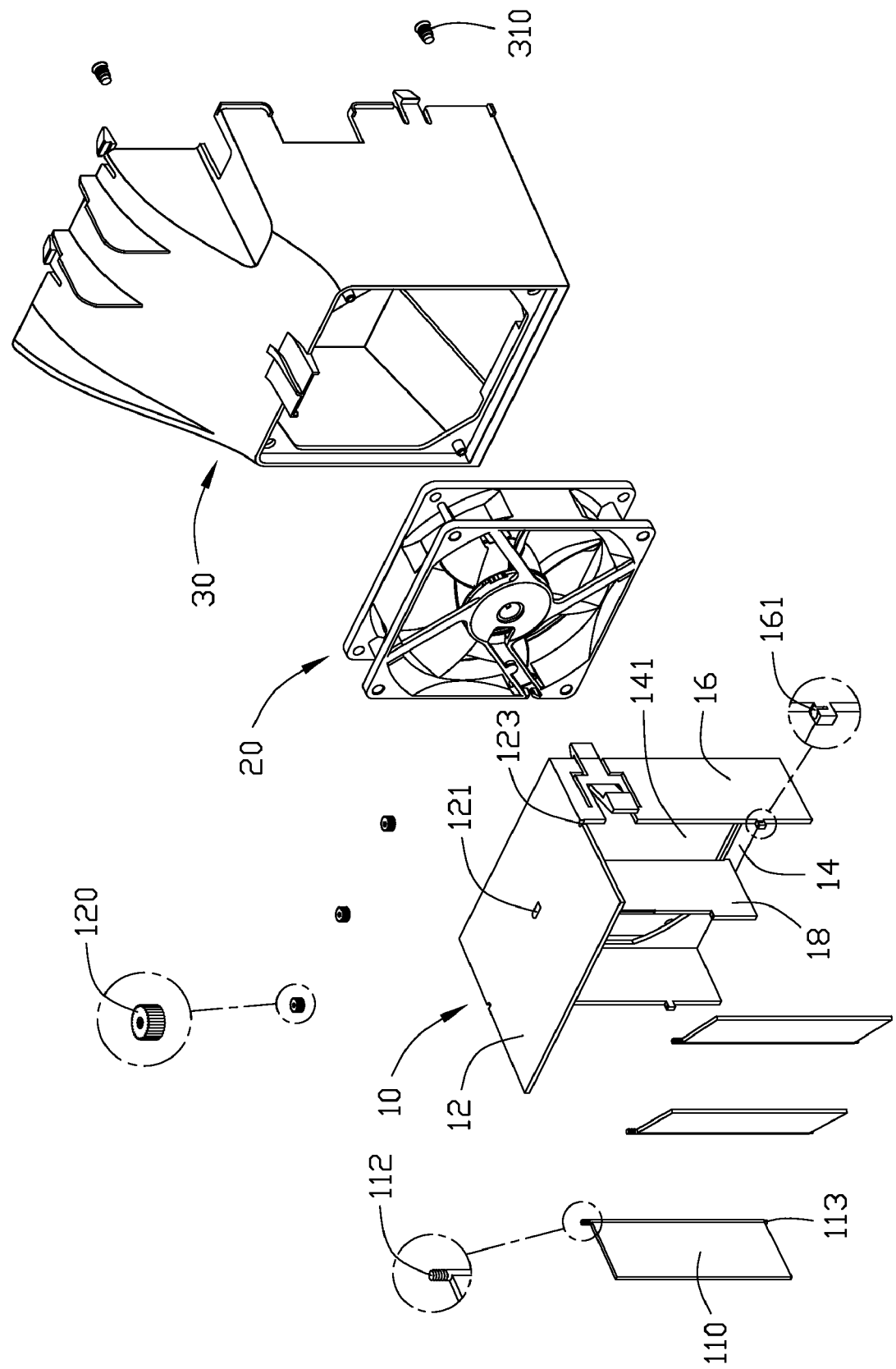
FIG. 2 is an exploded, enlarged view of the airflow guide structure of FIG. 1.

Referring also to FIG. 2, the airflow guide structure 200 includes a first duct 10, a fan 20, and a second duct 30. The first duct 10 includes a top panel 12, a rear panel 14 substantially perpendicularly connecting to a rear flange of the top panel 12, a pair of side panels 16 substantially perpendicularly connecting to two side flanges of the rear panel 14, and a partition panel 18 substantially perpendicularly connecting to the rear panel 14. A pair of airflow outlets 141 is defined in the rear panel 14 at opposite sides of the partition panel 18.

The airflow guide structure 200 further includes three pivot panels 110 and three mounting members 120. Each of the pivot panels 110 includes one upper pivot post 112 and one lower pivot post 113 protruding from a top corner and a bottom corner of a same edge respectively. Each upper pivot post 112 may have a threaded portion corresponding to the mounting member 120. A first pivot hole 121 is defined in a center portion of the top panel 12. A pair of second pivot holes 123 is defined at opposite sides of the top panel. The first pivot hole 121 and the second pivot holes 123 may be aligned along a same line. Each of the side panels 16 and the partition panel 18 defines a third pivot hole 161 therein corresponding to the lower pivot post 113 of the pivot panel 110. Two of the pivot holes 161 defined in the side panels 16 are aligned with the second pivot holes 123 in the top panel 12 respectively. One of the pivot holes 161 is defined in the partition panel 18 and aligned with the first pivot hole 121. The pivot panels 110 are pivotally attached to the front edges of the side panels 16 and the partition panel 18 respectively, via the pivot holes 121, 123, 161. A width of the pivot panel 110, the side panel 16, and the partition panel 18 is not greater than a width of the top panel 12.

Figure 3:
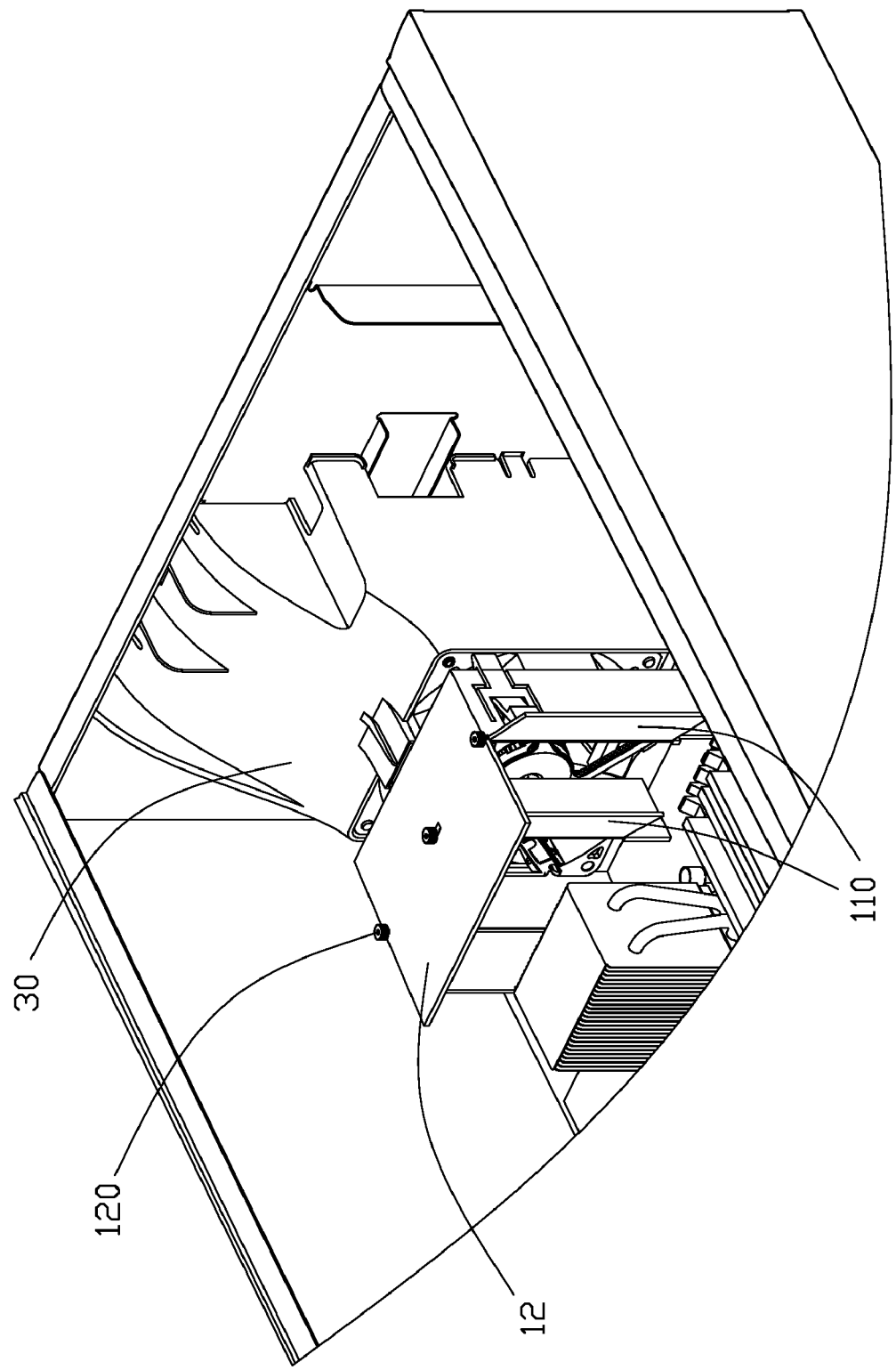
FIG. 3 is an assembled view of FIG. 1.

Referring to FIG. 3, the first duct 10 is mounted to one side of the fan 20. The second duct 30 is mounted to another side of the fan 20 via fasteners 310. The upper pivot posts 112 of the pivot panels 110 are engaged in the pivot holes 121 and 123. The lower pivot posts 113 of the pivot panels 110 are engaged in the third pivot holes 161. The mounting members 120 are attached to the upper pivot posts 112 of the pivot panels 110 to secure the pivot panels 110 to the first duct 10.

The second duct 30 of the airflow guide structure 200 is secured to an opening of a rear panel of the chassis 100, thereby securing the airflow guide structure 200 in the chassis 100.

The pivot panels 110 may be rotated to other directions to cool the electronic elements located at different positions in the chassis 100, by detaching the mounting members 120 from the upper pivot posts 112 of the pivot panels 110, rotating the pivot panels 110 to desired directions, and reattaching the mounting fasteners 120 to the upper pivot posts 112. For example, the pivot panels 110 at one airflow outlet 141 may be rotated to face the CPU in the chassis 100 to cool the CPU, and the pivot panels 110 at another airflow outlet 141 may be rotated to face the memory in the chassis 100 to cool the memory.

While the present disclosure has been illustrated by the description of embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure, comprising a chassis and an airflow guide structure comprising a fan and a duct attached to the fan, the duct comprising a plurality of pivot panels configured to guide airflow from the fan to different positions of heat generating components in the chassis, wherein a plurality of airflow outlets aligned with the fan is defined in the duct; the pivot panels are pivotally attached at airflow outlets;

wherein the duct comprises a pair of side panels and a partition panel; and the pivot panels are pivotally attached to the side panels and the partition panel respectively.

2. The computer enclosure of claim 1, wherein the duct further comprises a rear panel substantially perpendicularly connecting with the side panels and the partition panel; the airflow outlets are defined in the rear panel at opposite sides of the partition panel.

3. The computer enclosure of claim 2, wherein the duct further comprises a top panel substantially perpendicularly connecting with top edges of the side panels, the partition panel, and the rear panel; each of the pivot panels comprises an upper pivot post engaged with the top panel and a lower pivot post engaged with the side panel or the partition panel.

4. The computer enclosure of claim 3, wherein a width of the pivot panel, the side panel, and the partition panel is not greater than a width of the top panel.

5. The computer enclosure of claim 4, further comprising a plurality of mounting members attached to the upper pivot posts of the pivot panels.

6. The computer enclosure of claim 1, wherein the airflow guide structure further comprises another duct attached between the fan and the chassis.

7. An airflow guide structure, comprising:
a cooling fan;
a first duct attached to one side of the cooling fan, the first duct comprising a rear panel, a pair of side panels connecting with two sides of the rear panel, a partition panel inbetween the side panels thereby defining a pair of airflow outlets, and three pivot panels pivotally attached to the side panels and the partition panel respectively, to guide airflow through the airflow outlets to various directions; and
a second duct attached to another side of the cooling fan.

8. The airflow guide structure of claim 7, wherein the first duct further comprises a top panel substantially perpendicularly connecting with top edges of the side panels, the partition panels, and the rear panel; the pivot panels are engaged with the top panel.

9. The airflow guide structure of claim 8, wherein each of the pivot panels comprises an upper pivot post engaged with the top panel and a lower pivot post engaged with the side panels or the partition panel.

10. The airflow guide structure of claim 9, wherein upper pivot holes are defined in the top panel to receive the upper pivot post of the pivot panels; the partition panel and each of the side panels each define a lower pivot hole aligned with a corresponding one of the upper pivot holes.

11. The airflow guide structure of claim 10, wherein one of the upper pivot holes is defined in a center portion of the top panel, and the other pivot holes are respectively defined in two sides of the top panel in front of the side panels.

12. The airflow guide structure of claim 11, further comprising three mounting members attached to the upper pivot posts of the pivot panels.

13. The airflow guide structure of claim 7, wherein a width of the pivot panel, the side panel, and the partition panel is not greater than a width of the top panel.

\* \* \* \* \*